(12) United States Patent
Chen

(10) Patent No.: US 11,430,103 B2
(45) Date of Patent: Aug. 30, 2022

(54) METHOD FOR IMAGE PROCESSING, NON-TRANSITORY COMPUTER READABLE STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Yan Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 104 days.

(21) Appl. No.: 17/026,220

(22) Filed: Sep. 19, 2020

(65) Prior Publication Data

US 2021/0004952 A1   Jan. 7, 2021

Related U.S. Application Data

(63) Continuation of application No. PCT/CN2019/087585, filed on May 20, 2019.

(30) Foreign Application Priority Data

Jun. 8, 2018   (CN) .......................... 201810590031.5

(51) Int. Cl.
  *G06K 9/00*  (2022.01)
  *G06T 7/00*  (2017.01)
  (Continued)

(52) U.S. Cl.
  CPC .......... *G06T 7/0002* (2013.01); *G06K 9/6218* (2013.01); *G06K 9/6268* (2013.01);
  (Continued)

(58) Field of Classification Search
  CPC ................ G06T 7/0002; G06T 7/13; G06T 2207/10024; G06T 2207/30168; G06K 9/6218; G06K 9/6268
  (Continued)

(56) References Cited

U.S. PATENT DOCUMENTS 6,661,535 B1   12/2003 Fujimura et al.
7,064,865 B2 *  6/2006 Ishikawa ................. G06T 5/003
                                                                    358/1.9

(Continued)

FOREIGN PATENT DOCUMENTS

CN      101326549      12/2008
CN      101098387       3/2011

(Continued)

OTHER PUBLICATIONS

Kim, Dae-Chul, et al. "Moiré Reduction Using Inflection Point and Color Variation in Digital Camera of No Optical Low Pass Filter." IEICE Transactions on Information and Systems 98.12 (2015): 2290-2298. (Year: 2015).*

(Continued)

*Primary Examiner* — Jonathan S Lee
(74) *Attorney, Agent, or Firm* — Hodgson Russ LLP

(57) ABSTRACT

A method for image processing includes the following. Edge pixel points in the image to be processed are determined by performing edge detection on the image to be processed. The number of the edge pixel points in the image to be processed is determined as a first pixel number. Determine that a moire pattern exists in the image to be processed when the first pixel number is larger than a first number threshold.

15 Claims, 6 Drawing Sheets

(51) Int. Cl.
*G06T 7/13* (2017.01)
*G06K 9/62* (2022.01)

(52) U.S. Cl.
CPC ...... *G06T 7/13* (2017.01); *G06T 2207/10024* (2013.01); *G06T 2207/30168* (2013.01)

(58) Field of Classification Search
USPC .......................................................... 382/165
See application file for complete search history.

(56) References Cited

U.S. PATENT DOCUMENTS

| | | |
|---|---|---|
| 7,664,316 B2 | 2/2010 | Aoki |
| 2017/0337711 A1 | 11/2017 | Ratner et al. |
| 2018/0059275 A1 | 3/2018 | Bandura et al. |

FOREIGN PATENT DOCUMENTS

| | | |
|---|---|---|
| CN | 103123691 | 5/2013 |
| CN | 103645036 | 3/2014 |
| CN | 104657975 | 5/2015 |
| CN | 106875346 | 6/2017 |
| CN | 106936964 | 7/2017 |
| CN | 107424123 | 12/2017 |
| CN | 104486534 | 5/2018 |
| EP | 2924972 | 9/2015 |
| JP | 2003234893 | 8/2003 |
| JP | 2007124287 | 5/2007 |
| JP | 2010206725 | 9/2010 |
| WO | 2017051358 | 3/2017 |
| WO | 2017058349 | 4/2017 |

OTHER PUBLICATIONS

Simon, Christian, and In Kyu Park. "Correcting geometric and photometric distortion of document images on a smartphone." Journal of Electronic Imaging 24.1 (2015): 013038. (Year: 2015).*
WIPO, ISR for PCT/CN2019/087585, dated Aug. 20, 2019.
SIPO, First Office Action for CN Application No. 201810590031.5, dated Apr. 10, 2020.
SIPO, Notification to Grant Patent Right for Invention for CN Application No. 201810590031.5, dated Sep. 2, 2020.
IPI, Office Action for IN Application No. 202017049651, dated Sep. 27, 2021.
Patel et al., "Live Face Video vs. Spoof Face Video: Use of Moire Patterns to Detect Replay Video Attacks," IEEE International Conference on Biometrics (ICB), 2015, pp. 98-105.
EPO, Extended European Search Report for EP Application No. 19815682.0, dated May 11, 2021.

* cited by examiner

METHOD FOR IMAGE PROCESSING, NON-TRANSITORY COMPUTER READABLE STORAGE MEDIUM, AND ELECTRONIC DEVICE

CROSS-REFERENCE TO RELATED APPLICATION(S)

This application is a continuation of International Application No. PCT/CN2019/087585, filed on May 20, 2019, which claims priority to Chinese Patent Application No. 201810590031.5, filed on Jun. 8, 2018, the entire disclosures of which are incorporated herein by reference.

TECHNICAL FIELD

This disclosure relates to the technical field of computers, and particularly to a method for image processing, a non-transitory computer readable storage medium, and an electronic device.

BACKGROUND

When smart devices are used to capture images, a photosensitive element of a camera of the smart device has a spatial frequency. If an object to be captured has the same spatial frequency, the spatial distribution of the photosensitive element is relatively close to that of the object to be captured, thereby leading to a moire pattern which interferes with the image. To detect the moire pattern in the image, the image generally needs to be subjected to space conversion. However, such detection has a relatively low efficiency.

SUMMARY

Embodiments provide a method for image processing, a non-transitory computer readable storage medium, and an electronic device.

A method for image processing is provided. The method includes the following. An image to be processed is obtained. Edge pixel points in the image to be processed are determined by performing edge detection on the image to be processed. The number of the edge pixel points in the image to be processed is determined as a first pixel number. When the first pixel number is larger than a first number threshold, determine that a moire pattern exists in the image to be processed.

A non-transitory computer readable storage medium is provided. The non-transitory computer readable storage medium is configured to store computer programs. The computer programs, when executed by a processor, are operable with the processor to: obtain an image to be processed; determine edge pixel points in the image to be processed by performing edge detection on the image to be processed; determine the number of the edge pixel points in the image to be processed as a first pixel number; determine that a moire pattern exists in the image to be processed when the first pixel number is larger than a first number threshold.

An electronic device is provided. The electronic device includes a memory and a processor. The memory is configured to store computer readable instructions which, when executed by the processor, are operable with the processor to: obtain an image to be processed; determine edge pixel points in the image to be processed by performing edge detection on the image to be processed; determine the number of the edge pixel points in the image to be processed as a first pixel number; determine that a moire pattern exists in the image to be processed when the first pixel number is larger than a first number threshold.

BRIEF DESCRIPTION OF THE DRAWINGS

In order to describe technical solutions of embodiments or the related art more clearly, the following will give a brief description of accompanying drawings used for describing the embodiments or the related art. Apparently, the accompanying drawings described below merely illustrate some embodiments. Those of ordinary skill in the art can also obtain other accompanying drawings based on the accompanying drawings described below without creative efforts.

DETAILED DESCRIPTION

In order to enable those skilled in the art to better understand objects, technical solutions, and advantages of the disclosure, the solutions of the disclosure will be further described below through embodiments with reference to the accompanying drawings. It will be appreciated that the embodiments are described herein for the purpose of explaining the disclosure rather than limiting the disclosure.

It can be understood that terms "first", "second", and the like used in the disclosure are used to describe various elements, but these elements are not limited by these terms. The terms are only used to distinguish a first element from another element. For example, without departing from the scope of the disclosure, a first client may be referred to as a second client, and similarly, the second client may be referred to as the first client. Both the first client and the second client are clients, but they are not the same client.

Figure 1:
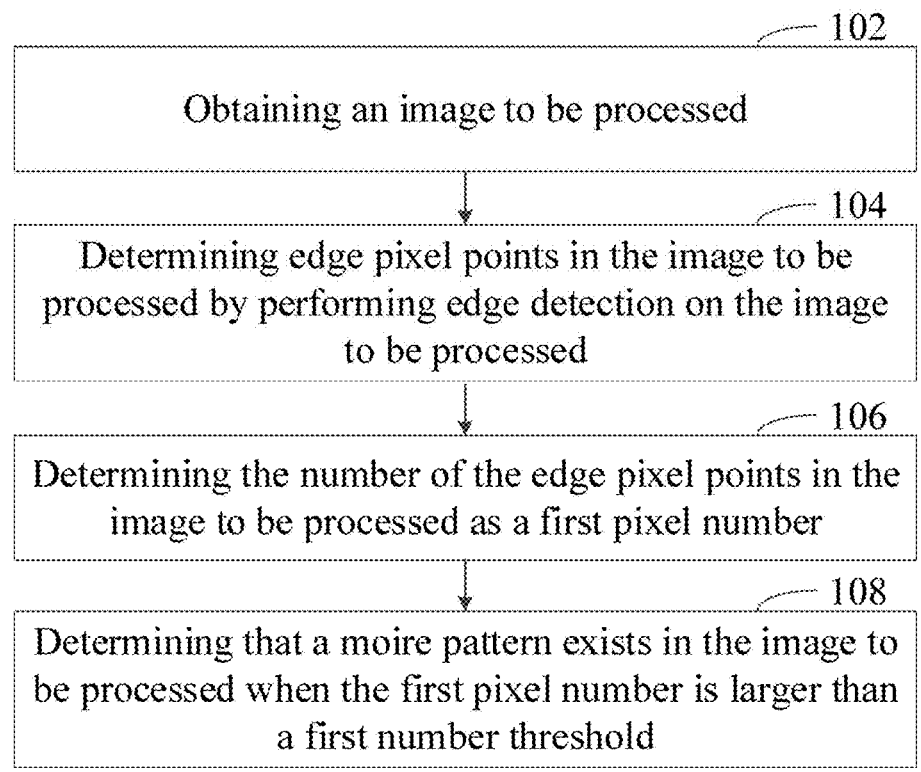
FIG. 1 is a schematic flow chart illustrating a method for image processing according to embodiments.

FIG. 1 is a schematic flow chart illustrating a method for image processing according to embodiments. As illustrated in FIG. 1, the method begins at block 102.

At block 102, an image to be processed is obtained.

In one example, an electronic device may have a built-in or external camera. There is no restriction on the position and the number of the cameras on the electronic device. For example, there is one camera on the front of a mobile phone and two cameras on the back of the mobile phone. Image shooting generally involves the following two stages: a shooting preview stage and a shooting stage. In the shooting preview stage, the camera may collect images at a certain time interval. The collected images may not be stored, but may be displayed for a user to view, such that the user can adjust a shooting angle, light, and other parameters according to the displayed images. Upon detecting a shooting instruction input by the user, the electronic device enters the shooting stage and stores a next image captured after receiving the shooting instruction as a finally captured image.

The electronic device can store the captured image and send the captured image to a server or other electronic devices. It can be understood that the obtained image to be processed is not limited to an image captured by the electronic device, but may also be an image sent by other electronic devices or downloaded via the network. After an image is obtained, the electronic device can process the image immediately or can store the image in a folder. When the number of images stored in the folder reaches a certain number, the electronic device can collectively process the stored images. As one example, the electronic device stores the obtained images in an album of the electronic device, and when the number of the images in the album is larger than a certain number, the electronic device is triggered to process the images in the album.

At block 104, edge pixel points in the image to be processed are determined by performing edge detection on the image to be processed.

Edge detection refers to the process of detecting pixel points in an image at which image brightness changes sharply. The pixel points in the image at which the image brightness changes sharply are referred to as edge pixel points. Edges in the image generally include the following three types of edges: step edge, roof edge, and linear edge. It can be understood that the image to be processed includes multiple pixel points, and brightness of pixel points in the edge sharply varies, so that the derivative operation can be performed on the pixel points in the image. According to results of the derivative operation, the pixel points in the image at which the image brightness changes sharply can be detected. Since edges in the image can be detected according to the results of the derivative operation, pixel points in the edge (also referred to as the edge pixel points) can also be determined.

For example, during shooting of scenery, an edge line is formed at the junction of beach and sea water. The edge line formed at the junction of beach and sea water can be detected with the edge detection, and pixel points in the edge line are determined as the edge pixel points. In one example, the edge pixel points can be determined with methods including but not limited to the Canny, Roberts, Prewitt, and Sobel methods.

At 106, the number of the edge pixel points in the image to be processed is determined as a first pixel number.

The pixel points in the edge of the image to be processed can be detected with the edge detection. When a pixel point in the edge (that is, edge pixel point) is detected, the edge pixel point can be marked. Thus, the edge pixel points in the image to be processed can be identified according to the markers of the edge pixel points. Thereafter, the number of the edge pixel points marked is determined as the first pixel number. For example, a brightness value of the edge pixel point is marked with a specific value, so that the number of the pixel points each having the brightness value that is equal to the specific value can be directly determined as the first pixel number.

At block 108, when the first pixel number is larger than a first number threshold, determine that a moire pattern exists in the image to be processed.

Moire patterns are caused by high-frequency interference during imaging with the photosensitive element and are irregular stripes in the image. The irregular stripes are generally densely distributed in the image, so that the moire patterns occupy a relatively large area in the image. For example, when a screen of a mobile phone or a computer is captured, some irregular stripes that are not on the screen are produced in the image. Such irregular stripes are referred to as the moire patterns. According to embodiments, edge lines of the irregular stripes can be detected with the edge detection, and then the number of pixel points in the edge lines is determined. If the number of the pixel points determined exceeds a certain value, it indicates that the irregular stripes are relatively densely distributed in the image and accordingly, the irregular stripes are the moire patterns in the image.

In one example, since the resolutions of the obtained images to be processed may be different, the above-mentioned first number threshold can be determined according to a percentage of the total number of the pixel points in the image to be processed. For example, the first number threshold may be 50% of the total number of the pixel points in the image to be processed. For another example, the first number threshold may be a fixed number threshold. Each image to be processed can be scaled to a fixed size before the edge detection, and then compare the number of the edge pixel points with the fixed number threshold.

Figure 2:
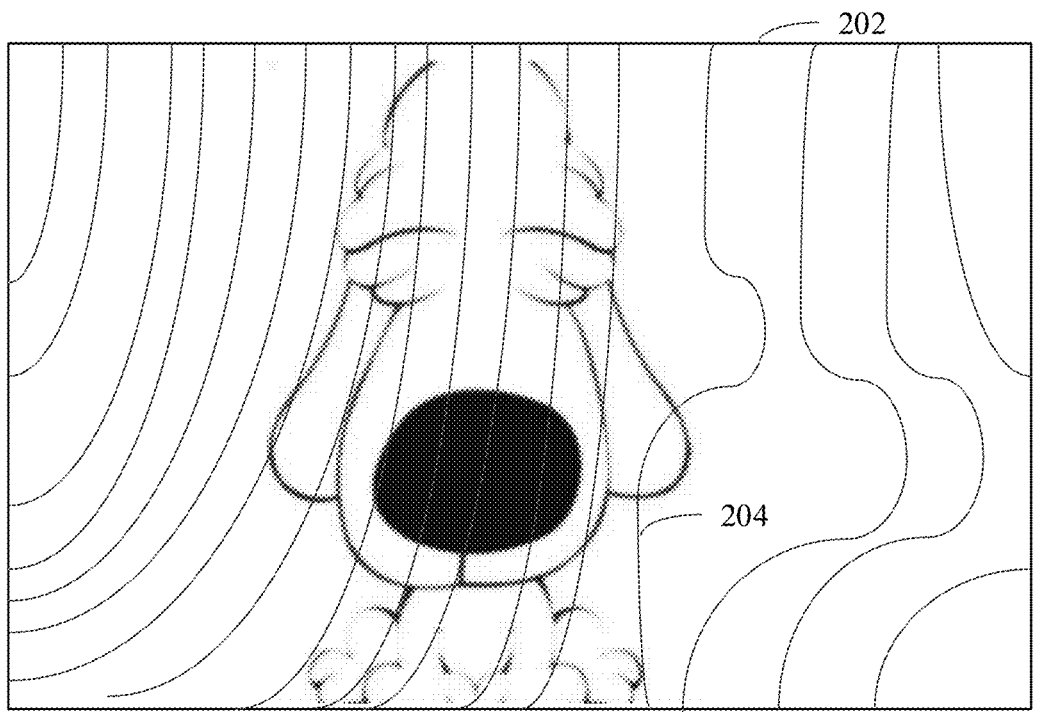
FIG. 2 is a schematic diagram illustrating moire patterns in an image according to embodiments.

FIG. 2 is a schematic diagram illustrating moire patterns in an image according to embodiments. As illustrated in FIG. 2, the image 202 includes irregularly distributed stripes. The irregularly distributed stripes are moire patterns 204. The electronic device may first detect at least one edge in the image 202 and determine whether there are moire patterns 204 in the image 202 according to the number of edge pixel points determined.

In the method for image processing, the edge pixel points in the image to be processed are determined by performing the edge detection on the image to be processed. The first pixel number of the edge pixel points in the image to be processed is determined. Determine whether one or more moire patterns exist in the image to be processed according to the first pixel number. In this way, the moire patterns in the image to be processed can be quickly detected without space conversion, thereby improving the efficiency of image processing.

Figure 3:
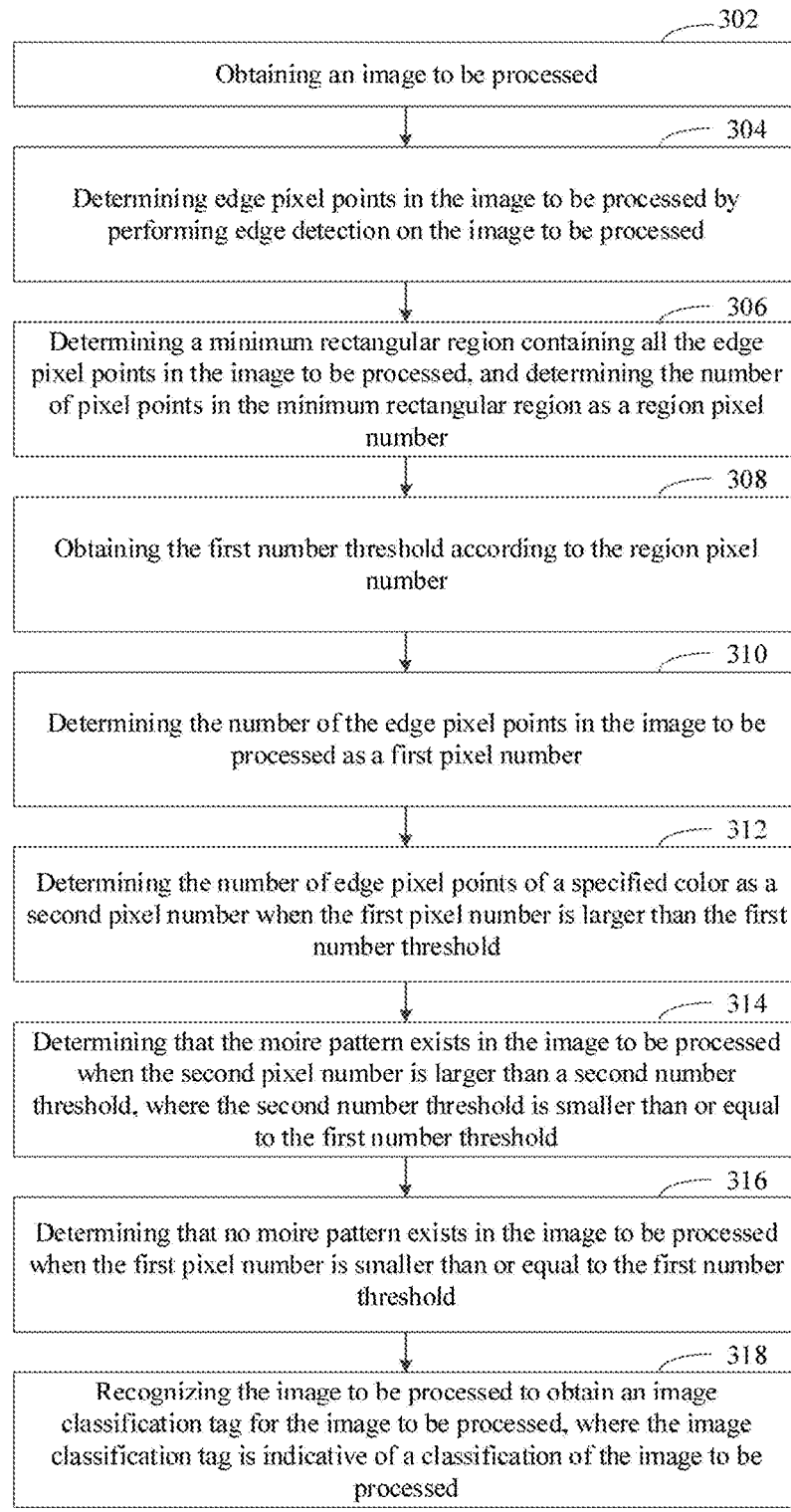
FIG. 3 is a schematic flow chart illustrating a method for image processing according to other embodiments.

FIG. 3 is a schematic flow chart illustrating a method for image processing according to other embodiments. As illustrated in FIG. 3, the method begins at block 302.

At block 302, an image to be processed is obtained.

In one example, the electronic device can collectively process a large number of images to be processed. Consider that there are more images to be processed, due to the limited processing capability of the terminal, the terminal may first upload the large number of the images to be processed to a server, such that the server can process the large number of the images to be processed and then return processing results to the terminal. Alternatively, the terminal may also process the large number of the images to be processed while in a standby state, such that resources of the terminal may not be occupied and use of the terminal may not be affected.

At block 304, edge pixel points in the image to be processed are determined by performing edge detection on the image to be processed.

The electronic device can collectively process a large number of images to be processed. When the electronic device processes a large number of images to be processed, in order to increase a speed of processing the images to be processed, the electronic device can collectively scale the images to be processed down to a fixed size and then perform the edge detection on the images to be processed that are scaled down to determine edge pixel points in each image to be processed that is scaled down. The number of the edge pixel points in each image to be processed that is scaled down is determined to determine whether one or moire patterns exist in the image to be processed.

At block 306, a minimum rectangular region containing all the edge pixel points in the image to be processed is determined and the number of pixel points in the minimum rectangular region is determined as a region pixel number.

It can be understood that during image shooting, moire patterns may be caused by a part of an object, that is to say, the moire patterns merely appear in a certain region of the image rather than in the entire image, such that if the density of edge lines in the image to be processed is determined with reference to the entire image, errors may occur. Therefore, in terms of determining whether the moire pattern exists, the density of edge lines can be determined only according to a region where the edge lines appear, thereby improving the accuracy.

The minimum rectangular region refers to a minimum rectangle containing all edge pixel points. After the edge pixel points are detected, the minimum rectangular region is determined according to positions of the edge pixel points. After the minimum rectangular region is determined, the number of pixel points in the minimum rectangular region is determined as the region pixel number. If the region pixel number is larger, it indicates that there are more pixel points in the minimum rectangular region.

At block 308, the first number threshold is obtained according to the region pixel number.

In one example, whether the moire pattern exists can be determined according to the number of the edge pixel points in the minimum rectangular region. The first number threshold can be determined according to a percentage of the region pixel number, and then compare the number of the edge pixel points with the first number threshold to determine the density of edge lines in the minimum rectangular region, so as to determine whether the moire pattern exists. For example, if there are 10000 pixel points in the minimum rectangular region, 40% of the region pixel number can be determined as the first number threshold, that is, the first number threshold is 4000 pixel points.

At block 310, the number of the edge pixel points in the image to be processed is determined as a first pixel number.

The first pixel number of the edge pixel points in the image to be processed is determined. Since the minimum rectangular region corresponds to the rectangular rectangle containing all the edge pixel points, the first pixel number determined is the number of the edge pixel points in the minimum rectangular region. The electronic device may traverse pixel points in the image to be processed and then determine the first pixel number of the edge pixel points. Alternatively, the electronic device may traverse pixel points in the minimum rectangular region and then determine the first pixel number of the edge pixel points, which is not limited herein.

In one example, after an edge pixel point in the image to be processed is detected, the edge pixel point can be marked. In the process of traversing the pixel points in the image to be processed, when a pixel point is determined as an edge pixel point, a counter is increased by one. The counter continues counting until all the pixel points in the image to be processed are traversed, and a value obtained by the counter is determined as the first pixel number.

At block 312, the number of edge pixel points of a specified color is determined as a second pixel number when the first pixel number is larger than the first number threshold.

The first pixel number determined is compared with the first number threshold. When the first pixel number is larger than the first number threshold, it indicates that the edge lines are densely distributed. Otherwise, it indicates that the edge lines are sparsely distributed. When the edge lines are densely distributed, it indicates that the moire pattern may exist in the image to be processed.

It can be understood that the moire pattern in the image generally has a certain color variation rule, so during determination of the number of the edge pixel points, only the edge pixel points of the specified color may be determined. The edge pixel points of the specified color can be regarded as the pixel points of the moire patterns. Thereafter, the number of the edge pixel points of the specified color can be determined as the second pixel number.

At block 314, determine that the moire pattern exists in the image to be processed when the second pixel number is larger than a second number threshold, where the second number threshold is smaller than or equal to the first number threshold.

In at least one embodiment, if the second pixel number determined is larger than the second number threshold, determine that the moire pattern exists in the image to be processed. When it is determined that the moire patterns exist in the image to be processed, the moire patterns in the image to be processed may be eliminated, such that the image to be processed can be restored. According to embodiments, the first number threshold is obtained according to the region pixel number. To ensure that the second number threshold is smaller than or equal to the first number threshold, the second number threshold needs to be adjusted accordingly according to the first number threshold.

At block 316, when the first pixel number is smaller than or equal to the first number threshold, determine that no moire pattern exists in the image to be processed.

When the first pixel number is smaller than or equal to the first number threshold, it indicates that the edge pixel points in the image to be processed are sparsely distributed, and thus it is determined that there is no moire pattern in the image to be processed. On the other hand, when the first pixel number is larger than the first number threshold and the second pixel number is smaller than or equal to the second number threshold, it also indicates that the edge pixel points in the image to be processed are sparsely distributed, and thus it is determined that there is no moire pattern in the image to be processed.

At block 318, recognize the image to be processed to obtain an image classification tag for the image to be processed, where the image classification tag is indicative of a classification of the image to be processed.

In one example, recognizing the image to be processed means that recognize a shooting scenario of the image to be processed. The image classification tag for the image to be processed can be obtained by recognizing the image to be processed. The shooting scenario of the image to be processed may include beach, snow-covered landscape, night view, blue sky, indoor, and other scenarios. If the shooting scenario of the image to be processed is recognized to be snow-covered landscape, an image classification tag "scenario-snow" may be generated.

Generally, during recognition of the image to be processed, if there are one or more moire patterns in the image to be processed, the image to be processed may not be accurately recognized. Therefore, upon detecting that there are one or more moire patterns in the image to be processed, the image to be processed may not be recognized, or the image to be processed may be recognized after the one or more moire patterns are eliminated. When no moire pattern exists in the image to be processed, the image to be processed can be recognized to obtain the image classification tag.

In one example, during recognition of the image to be processed, a foreground target and a background region in the image to be processed can be detected first. The foreground target refers to a main subject in the image to be processed that the user pays more attention to. A region in the image to be processed other than the foreground target is a background region. For example, in a captured image, a person can be regarded as a foreground target, and a beach can be regarded as a background region.

The foreground target detected includes part of or all pixel points in the image to be processed. The number of pixel points in a region where the foreground target locates can be determined, and a target area occupied by the foreground target can be calculated according to the number of the pixel points determined. The target area can be directly expressed by the number of the pixel points in the foreground target, or can be expressed by a ratio of the number of the pixel points in the foreground target to the number of the pixel points in the image to be processed. The larger the number of the pixel points in the foreground target, the larger the corresponding target area.

After the foreground target is detected, the electronic device can obtain the target area of the foreground target. If the target area is larger than an area threshold, it can be considered that the foreground target is relatively large and a corresponding background region is relatively small. When the background region is too small, the background region may not be accurately recognized, such that the image classification can be conducted according to the foreground target. For example, when the foreground target accounts for more than half of the image to be processed, the image classification tag is generated according to a recognition result of the foreground target. For another example, when the target area of the foreground target is smaller than half of the area of the image to be processed, the image classification tag is generated according to a recognition result of the background region. After the foreground target is detected, the target area of the foreground target can be obtained. When the target area is larger than the area threshold, the image classification tag can be obtained by recognizing the foreground target. Otherwise, the image classification tag can be obtained by recognizing the background region.

Figure 4:
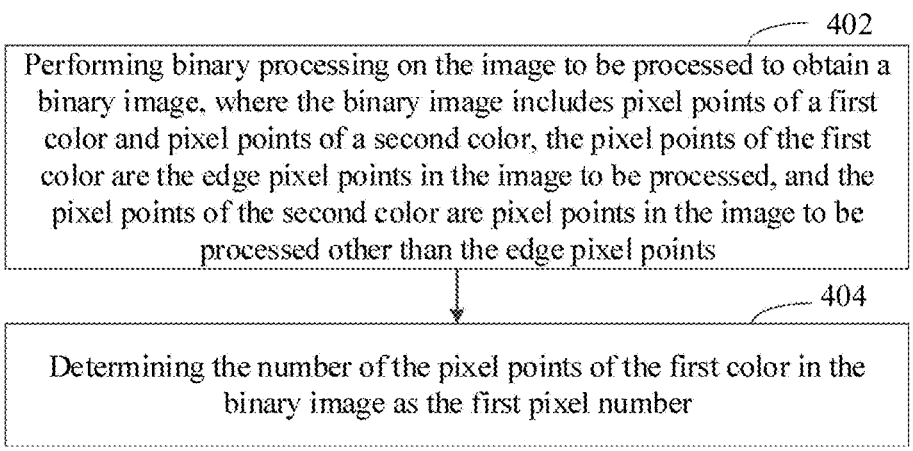
FIG. 4 is a schematic flow chart illustrating a method for image processing according to other embodiments.

In at least one embodiment, as illustrated in FIG. 4, the first pixel number of the edge pixel points in the image to be processed can be determined as follows.

At block 402, binary processing is performed on the image to be processed to obtain a binary image, where the binary image includes pixel points of a first color and pixel points of a second color, the pixel points of the first color are the edge pixel points in the image to be processed, and the pixel points of the second color are pixel points in the image to be processed other than the edge pixel points.

After edges in the image to be processed are detected, the binary processing can be performed on the image to be processed to obtain the binary image. After the binary processing is completed, the binary image only includes pixel points of two colors. The binary processing means that all the edge pixel points in the image to be processed are converted to pixel points of the first color, and pixel points in the image to be processed other than the edge pixel points are converted to pixel points of the second color. For example, gray values of the edge pixel points are all set to be 255, and gray values of pixel points other than the edge pixel points are all set to be 0. In this way, edge pixel points and pixel points except the edge pixel points can be distinguished by color.

At block 404, the number of the pixel points of the first color in the binary image is determined as the first pixel number.

After the image to be processed is converted into the binary image, the binary image only includes pixel points of two colors, such that the edge pixel points can be quickly recognized according to the colors of the pixel points. The number of the pixel points of the first color in the binary image can be determined as the first pixel number. For example, if the gray values of the edge pixel points are all set to be 255 and the gray values of pixel points other than the edge pixel points are all set to be 0, the number of white pixel points with gray values of 255 can be determined as the first pixel number.

Figure 5:
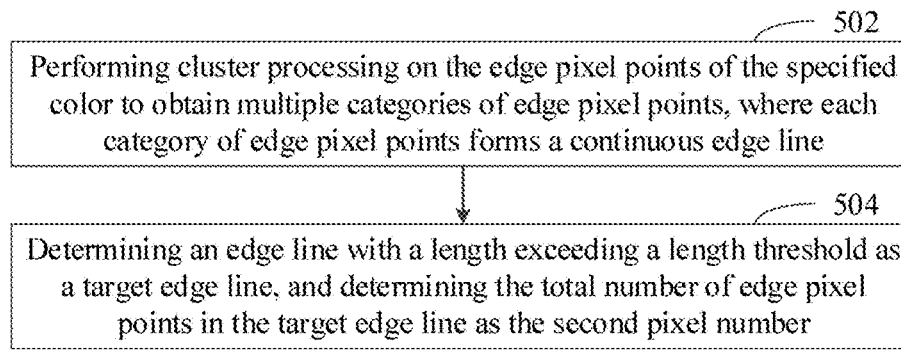
FIG. 5 is a schematic flow chart illustrating a method for image processing according to other embodiments.

In at least one embodiment, as illustrated in FIG. 5, the second pixel number is determined as follows.

At block 502, cluster processing is performed on the edge pixel points of the specified color to obtain multiple categories of edge pixel points, where each category of edge pixel points forms a continuous edge line.

Edge lines forming the moire pattern are substantially continuous. After the edge pixel points are determined, the cluster processing can be conducted on the edge pixel points to obtain the multiple categories of edge pixel points, where each category of edge pixel points forms a continuous edge line. In other words, the edge pixel points that can form a continuous edge line are determined as one category, and then a length of each continuous edge line can be determined. In at least one embodiment, the cluster processing can be performed on the edge pixel points of the specified color to obtain the multiple categories of edge pixel points, where each category of the edge pixel points forms a continuous edge line.

At block 504, an edge line with a length exceeding a length threshold is determined as a target edge line and the total number of edge pixel points in the target edge line is determined as the second pixel number.

After the cluster processing is performed on the edge pixel points, each category of the edge pixel points obtained via the cluster processing forms a continuous edge line. Thereafter, the length of each edge line is calculated, and the edge line with the length exceeding the length threshold is considered as the edge line that may form the moire pattern. The length of the edge line can be expressed by the number of edge pixel points in the edge line. The more the edge pixel points are contained, the longer the edge line is.

The edge line with a length exceeding the length threshold can be regarded as the target edge line, that is to say, the target edge line may be an edge line that forms the moire pattern. Thereafter, lengths of all target edge lines are added, that is, the number of edge pixel points in the all target edge lines are added, such that the total number of edge pixel points can be taken as the second pixel number. Whether the moire pattern exists in the image to be processed is determined according to the second pixel number.

Figure 6:
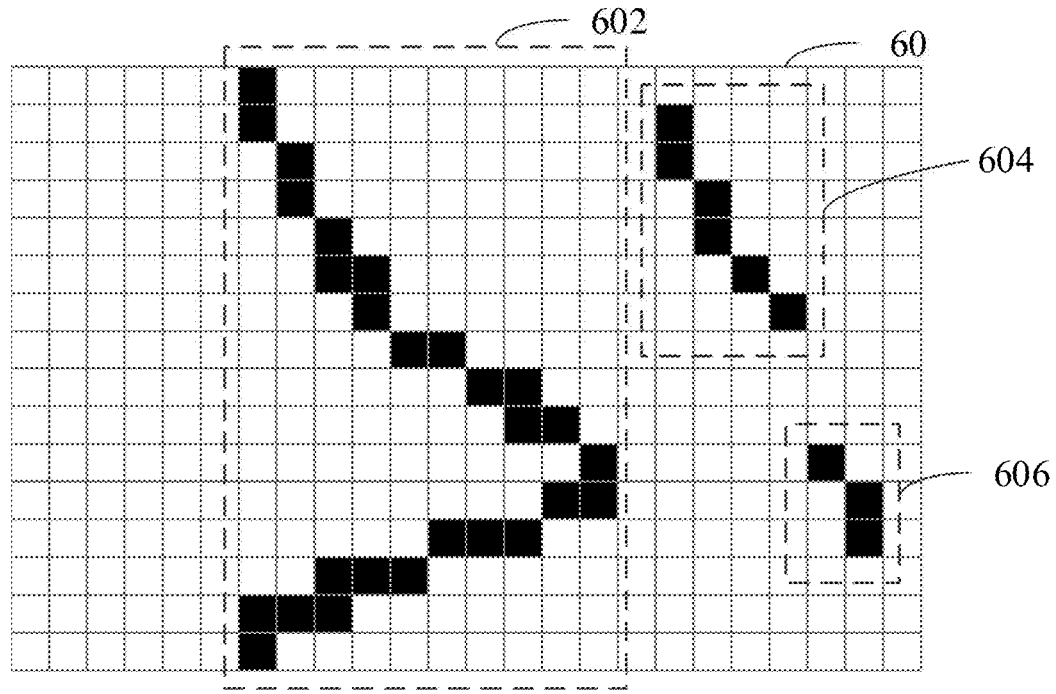
FIG. 6 is a schematic diagram illustrating edge lines according to embodiments.

FIG. 6 is a schematic diagram illustrating edge lines according to embodiments. As illustrated in FIG. 6, an image to be processed 60 includes multiple edge pixel points. Cluster processing is performed on the multiple edge pixel points to obtain multiple categories of edge pixel points, where each category of edge pixel points forms a continuous edge line. In FIG. 6, an edge line 602, an edge line 604, and an edge line 606 are illustrated. Thereafter, at least one target edge line is determined according to the length of each of the edge lines. For example, if the length of the edge line 602 exceeds a length threshold, and lengths of the edge line 604 and the edge line 606 are respectively shorter than the length threshold, the edge line 602 can be determined as the target edge line.

Figure 7:
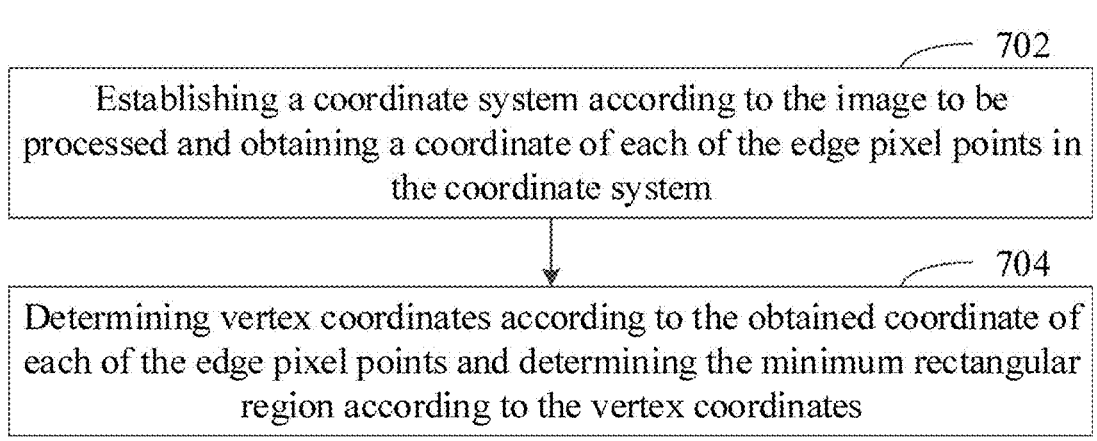
FIG. 7 is a schematic flow chart illustrating a method for image processing according to other embodiments.

In at least one embodiment, as illustrated in FIG. 7, the minimum rectangular region can be determined as follows.

At block 702, a coordinate system is established according to the image to be processed and a coordinate of each of the edge pixel points in the coordinate system is obtained.

The image to be processed including multiple pixel points can form a two-dimensional matrix. According to the image to be processed, a coordinate system can be established, so that a position of each pixel point in the image to be processed can be expressed by a two-dimensional coordinate. As such, the specific position of the pixel point can be determined with the two-dimensional coordinate. For example, the pixel point at the lower left corner of the image to be processed can be defined as a coordinate origin to establish the coordinate system. Every a pixel point from the coordinate origin to the right the abscissa increases by one, and every a pixel point from the coordinate origin to the upward the ordinate increases by one.

After the coordinate system is established, the position of each of the edge pixel points can be determined by a two-dimensional coordinate. The two-dimensional coordinate includes an abscissa and an ordinate, where the abscissa represents a horizontal displacement of the edge pixel point relative to the coordinate origin, and the ordinate represents a vertical displacement of the edge pixel point relative to the coordinate origin. For example, if a coordinate of an edge pixel point is represented as (20, 150), it means that the edge pixel point locates on a position 20 pixel points away from the coordinate original in a horizontal position direction and 150 pixel points away from the coordinate origin in a vertical position direction.

At block 704, vertex coordinates are determined according to the obtained coordinate of each of the edge pixel points and the minimum rectangular region is determined according to the vertex coordinates.

After the coordinate of each of the edge pixel points is obtained, the vertex coordinates can be determined according to the obtained coordinate of each of the edge pixel points, such that the minimum rectangular region can be determined according to the vertex coordinates. The coordinate of a pixel point include an abscissa and an ordinate. The minimum abscissa and the maximum abscissa may be determined according to the obtained abscissa of each of the edge pixel points, and the minimum ordinate and the maximum ordinate may be determined according to the obtained ordinate of each of the edge pixel points. The four vertex coordinates of the minimum rectangular region can be determined according to the obtained minimum abscissa and maximum abscissa, and the obtained minimum ordinate and maximum ordinate, and then the minimum rectangular region can be determined according to the four vertex coordinates.

Figure 8:
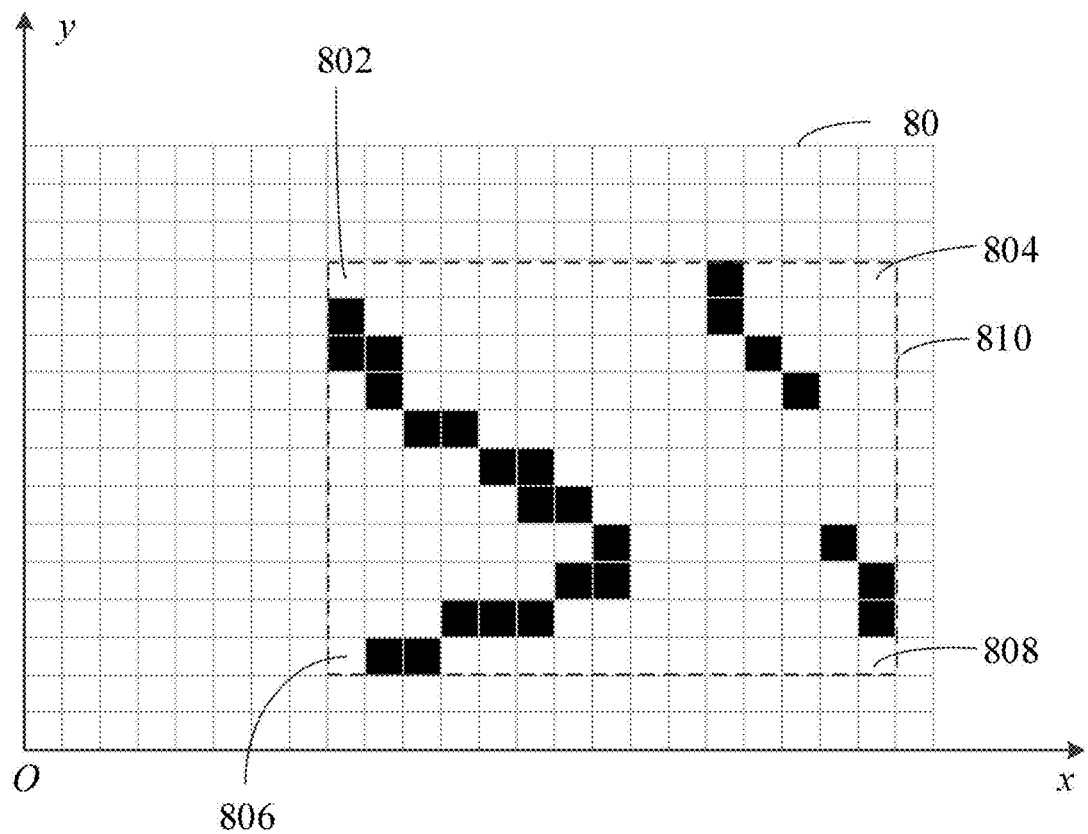
FIG. 8 is a schematic diagram illustrating a minimum rectangular region according to embodiments.

FIG. 8 is a schematic diagram illustrating a minimum rectangular region according to embodiments. As illustrated in FIG. 8, according to a to-be-processed image 80, a coordinate system can be established, where the pixel point at the lower left corner of the image to be processed may be defined as the coordinate origin O, a direction from the coordinate origin to the right of the coordinate may be defined as the positive direction of the x-axis, and a direction from the coordinate origin to the upward may be defined as the positive direction of the y-axis. The coordinates of a vertex 802, a vertex 804, a vertex 806, and a vertex 808 (that is, four vertex coordinates) can be determined according to the coordinates of the edge pixel points, and a range of the minimum rectangular region 810 is determined according to the coordinates of the vertex 802, the vertex 804, the vertex 806, and the vertex 808.

In one example, after the minimum rectangular region is determined, the number of the pixel points in the minimum rectangular region is determined as the region pixel number. The first number threshold is determined according to the region pixel number. However, if the minimum rectangular region has a relatively small area, it can be considered that no moire pattern exists in the image to be processed. In one example, the area of the minimum rectangular region can be obtained. If the area of the minimum rectangular region is larger than an area threshold, the number of the pixel points in the minimum rectangular region is determined as the region pixel number. The first number threshold is determined according to the region pixel number. On the other hand, if the area of the minimum rectangular region is smaller than the area threshold, it can directly determine that there is no moire pattern in the image to be processed.

The area of the minimum rectangular region can be calculated according to the coordinates of the four vertexes (that is, the four vertex coordinates), a length and a width of the minimum rectangular region can be calculated according to the four vertex coordinates, and thus the area of the minimum rectangular region can be calculated according to the obtained length and width. The calculated area of the minimum rectangular region is equal to the region pixel number determined, such that the area of the minimum rectangular region can also be directly expressed by the region pixel number. That is, the number of the pixel points in the minimum rectangular region is determined as the region pixel number. When the region pixel number is larger than a region number threshold, the first number threshold is determined according to the region pixel number. Otherwise, it can directly determine that there is no moire pattern in the image to be processed.

In the method for image processing, the edge pixel points in the image to be processed are determined by performing the edge detection on the image to be processed. The minimum rectangular region containing all the edge pixel points in the image to be processed is determined. The first number threshold is determined according to the number of the pixel points in the minimum rectangular region. The first pixel number of the edge pixel points in the image to be processed is determined. Determine whether there is moire pattern in the image to be processed according to a comparison result of the first pixel number and the first number threshold. In this way, the moire pattern in the image to be processed can be quickly detected without space conversion, thereby improving the efficiency of image processing.

It should be understood that although operations in the flowcharts of FIG. 1, FIG. 3, FIG. 4, FIG. 5, and FIG. 7 are illustrated in sequence indicated by the arrows, these operations are not necessarily executed in sequence indicated by the arrows. Unless clearly stated herein, the execution of these operations is not strictly limited in sequence, and these operations can be executed in other sequence. Moreover, at least part of the operations in FIG. 1, FIG. 3, FIG. 4, FIG. 5, and FIG. 7 may include multiple sub-operations or multiple stages. These sub-operations or stages are not necessarily executed at the same time, but may be performed in different times. The sequence of execution of these sub-operations or stages is not necessarily sequential, but can be executed in turn or alternately with other operations or at least part of the sub-operations or stages of other operations.

Figure 9:
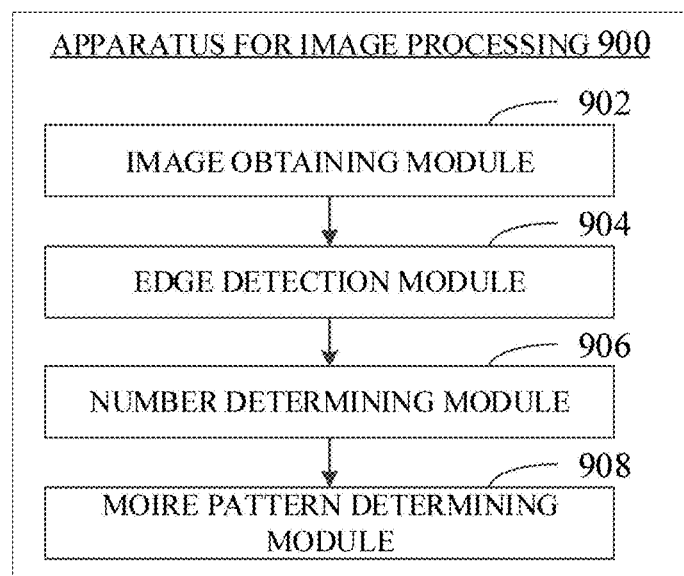
FIG. 9 is a schematic structural diagram illustrating an apparatus for image processing according to embodiments.

FIG. 9 is a schematic structural diagram illustrating an apparatus for image processing according to embodiments. As illustrated in FIG. 9, the apparatus 900 for image processing includes an image obtaining module 902, an edge detection module 904, a number determining module 906, and a moire pattern determining module 908. The image obtaining module 902 is configured to obtain an image to be processed. The edge detection module 904 is configured to determine edge pixel points in the image to be processed by performing edge detection on the image to be processed. The number determining module 906 is configured to determine the number of the edge pixel points in the image to be processed as a first pixel number. The moire pattern determining module 908 is configured to determine that moire pattern exists in the image to be processed when the first pixel number is larger than a first number threshold.

In the apparatus for image processing, the edge pixel points in the image to be processed are determined by performing the edge detection on the image to be processed. The number of the edge pixel points in the image to be processed is determined as the first pixel number. Determine whether the moire pattern exists in the image to be processed according to the first pixel number. In this way, the moire pattern in the image to be processed can be quickly detected without space conversion, thereby improving the efficiency of image processing.

Figure 10:
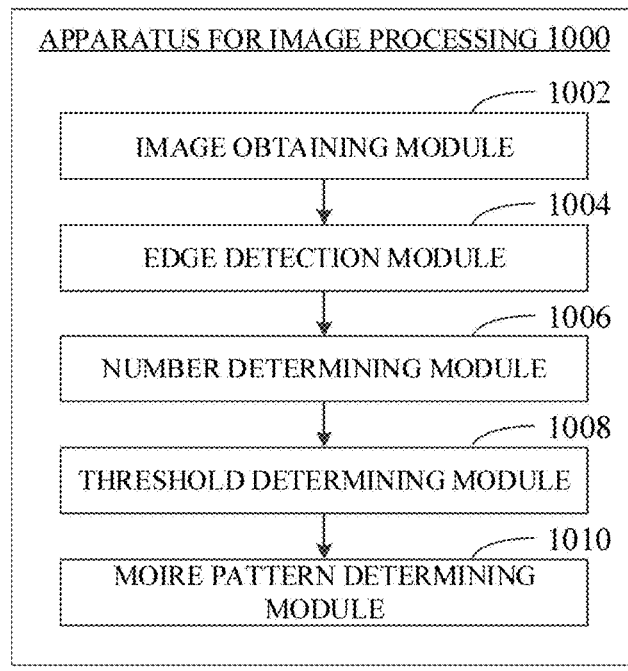
FIG. 10 is a schematic structural diagram illustrating an apparatus for image processing according to other embodiments.

FIG. 10 is a schematic structural diagram illustrating an apparatus for image processing according to other embodiments. As illustrated in FIG. 10, the apparatus 1000 for image processing includes an image obtaining module 1002, an edge detection module 1004, a number determining module 1006, a threshold determining module 1008, and a moire pattern determining module 1010. The image obtaining module 10 is configured to obtain an image to be processed. The edge detection module 1004 is configured to determine edge pixel points in the image to be processed by performing edge detection on the image to be processed. The number determining module 1006 is configured to determine the number of the edge pixel points in the image to be processed as a first pixel number. The threshold determining module 1008 is configured to determine a minimum rectangular region containing all the edge pixel points in the image to be processed, determine the number of pixel points in the minimum rectangular region as a region pixel number, and obtain the first number threshold according to the region pixel number. The moire pattern determining module 1010 is configured to determine that a moire pattern exists in the image to be processed when the first pixel number is larger than the first number threshold.

In the apparatus for image processing, the edge pixel points in the image to be processed are determined by performing the edge detection on the image to be processed. The first pixel number of the edge pixel points in the image to be processed is determined. Determine whether the moire pattern exists in the image to be processed according to the first pixel number. In this way, the moire pattern in the image to be processed can be quickly detected without space conversion, thereby improving the efficiency of image processing.

In one example, the number determining module 1006 configured to determine the number of the edge pixel points in the image to be processed as the first pixel number is configured to: perform binary processing on the image to be processed to obtain a binary image, where the binary image includes pixel points of a first color and pixel points of a second color, wherein the pixel points of the first color are the edge pixel points in the image to be processed, and the pixel points of the second color are pixel points in the image to be processed other than the edge pixel points; determine the number of the pixel points of the first color in the binary image as the first pixel number.

In one example, the threshold determining module 1008 configured to determine a minimum rectangular region containing all the edge pixel points in the image to be processed is configured to: establish a coordinate system according to the image to be processed and obtaining a coordinate of each of the edge pixel points in the coordinate system; determine vertex coordinates according to the obtained coordinate of each of the edge pixel points and determining the minimum rectangular region according to the vertex coordinates.

In one example, the moire pattern determining module 1010 configured to determine that a moire pattern exists in the image to be processed when the first pixel number is larger than the first number threshold is configured to: determine the number of edge pixel points of a specified color as a second pixel number when the first pixel number is larger than the first number threshold; determine that the moire pattern exists in the image to be processed when the second pixel number is larger than a second number threshold, where the second number threshold is smaller than or equal to the first number threshold.

In one example, the moire pattern determining module 1010 configured to determine the number of the edge pixel points of the specified color as the second pixel number is configured to: perform cluster processing on the edge pixel points of the specified color to obtain multiple categories of edge pixel points, where each category of edge pixel points forms a continuous edge line; determine an edge line with a length exceeding a length threshold as a target edge line; determine the total number of edge pixel points in the target edge line as the second pixel number.

In one example, the moire pattern determining module 1010 is further configured to: determine that the moire pattern does not exist in the image to be processed when the first pixel number is smaller than or equal to the first number threshold; recognize the image to be processed to obtain an image classification tag for the image to be processed, where the image classification tag is indicative of a classification of the image to be processed.

The division of each module in the above apparatus for image processing is only for illustration. The apparatus for image processing can be divided into different modules according to needs to complete all or part of the functions of the apparatus for image processing.

A computer readable storage medium is provided. One or more non-transitory computer readable storage medium contains computer executable instructions which, when executed by one or more processors, are operable with the one or more processors to perform the method for image processing provided by foregoing embodiments.

A computer program product is provided. The computer program product contains instructions which, when executed by a computer, are operable with the computer to perform the method for image processing provided by foregoing embodiments.

Figure 11:
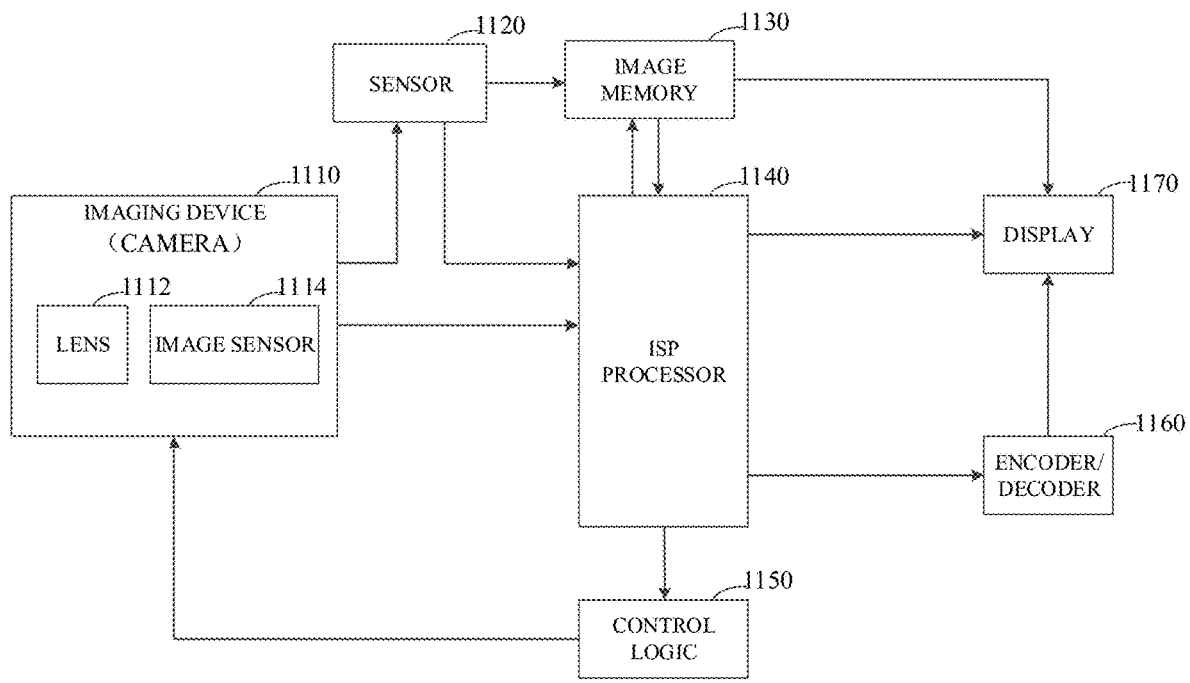
FIG. 11 is a schematic diagram illustrating an image processing circuit according to embodiments.

An electronic device is provided. The electronic device includes an image processing circuit. The image processing circuit can be implemented by hardware and/or software components, and can include various processing units that define image signal processing (ISP) pipeline. FIG. 11 is a schematic diagram illustrating an image processing circuit according to embodiments. As illustrated in FIG. 11, for the convenience of description, only various aspects of the image processing technology related to the embodiments of the disclosure are illustrated.

As illustrated in FIG. 11, the image processing circuit includes an ISP processor 1140 and a control logic 1150. The image data captured by an imaging device 1110 is first processed by the ISP processor 1140, which analyzes the image data to capture image statistics that can be used to determine one or more control parameters of the imaging device 1110. The imaging device 1110 may include a camera having one or more lenses 1112 and an image sensor 1114. The image sensor 1114 may include an array of color filters (such as Bayer filters), and the image sensor 1114 may acquire light intensity and wavelength information captured by each imaging pixel of the image sensor 1114, and provide a set of original image data that can be processed by the ISP processor 1140. A sensor 1120 (such as a gyroscope) may provide obtained image processing parameters (such as anti-shake parameters) to the ISP processor 1140 based on an interface type of the sensor 1120. The interface of the sensor 1120 may use a standard mobile imaging architecture (SMIA) interface, other serial or parallel camera interfaces, or a combination of the above interfaces.

In addition, the image sensor 1114 can also send original image data to the sensor 1120, and the sensor 1120 may provide the original image data to the ISP processor 1140 based on the interface type of the sensor 1120, or the sensor 1120 may store the original image data in an image memory 1130.

The ISP processor 1140 processes the original image data pixel by pixel in various formats. For example, each image pixel may have a bit depth of 8, 10, 12, or 14 bits, and the ISP processor 1140 may perform one or more image processing operations on the original image data to collect statistical information related to the image data, where the image processing operations can be performed with the same or different bit depth accuracy.

The ISP processor 1140 may also receive image data from the image memory 1130. For example, the interface of the sensor 1120 sends the original image data to the image memory 1130, and the original image data in the image memory 1130 is provided to the ISP processor 1140 for processing. The image memory 1130 may be a part of a memory device, a storage device, or a separate dedicated memory within an electronic device, and may include a direct memory access (DMA) feature.

Upon receiving original image data from the interface of the image sensor 1114 or from the interface of the sensor 1120 or from the image memory 1130, the ISP processor 1140 may perform one or more image processing operations, such as time-domain filtering. The processed image data may be sent to the image memory 1130 for further processing before being displayed. The ISP processor 1140 receives the processed data from the image memory 1130, and performs on the processed data image data processing in the original domain and in the RGB and YCbCr color spaces. The image data processed by the ISP processor 1140 may be output to the display 1170 for viewing by the user and/or further processing by a graphics engine or Graphics Processing Unit (GPU). In addition, the output of the ISP processor 1140 can also be sent to the image memory 1130, and the display 1170 can read image data from the image memory 1130. In one example, the image memory 1130 may be configured to implement one or more frame buffers. In addition, the output of the ISP processor 1140 may be sent to the encoder/decoder 1160 to encode/decode the image data. The encoded image data can be saved and decompressed before being displayed on the display 1170. The encoder/decoder 1160 may be implemented by a CPU or GPU or coprocessor.

The statistical data determined by the ISP processor 1140 may be sent to the control logic 1150. The statistical data may include statistical information of the image sensor 1114 such as auto exposure, auto white balance, auto focus, flicker detection, black level compensation, and shading correction of the lens 1112. The control logic 1150 may include a processor and/or a microcontroller that executes one or more routines (such as firmware), where the one or more routines may determine control parameters of the imaging device 1110 and control parameters of the ISP processor 1140 based on the received statistical data. For example, the control parameters of the imaging device 1110 may include control parameters (such as gain, integration time of exposure control, anti-shake parameters, etc.) of the sensor 1120, flash control parameters of the camera, control parameters (such as focus or zoom focus) of the lens 1112, or a combination of the parameters. The control parameters of the ISP may include gain levels and color correction matrices used for automatic white balance and color adjustment (e.g., during RGB processing), and shading correction parameters of the lens 1112.

The following is an embodiment of the method for image processing provided by foregoing embodiments using the image processing technology in FIG. 11. Any reference to memory, storage, database, or other media used may include a non-transitory and/or transitory memory. Suitable non-transitory memory may include read-only memory (ROM), programmable ROM (PROM), electrically programmable ROM (EPROM), electrically erasable programmable ROM (EEPROM), or flash memory. The transitory memory can include random access memory (RAM), which acts as external cache memory. By way of illustration and not limitation, RAM is available in many forms, such as a static RAM (SRAM), a dynamic RAM (DRAM), a synchronous DRAM (SDRAM), a double data rate SDRAM (DDR SDRAM), an enhanced SDRAM (ESDRAM), a synchronous Link (Synchlink) DRAM (SLDRAM), a memory bus (Rambus) direct RAM (RDRAM), a direct memory bus dynamic RAM (DRDRAM), and a memory bus dynamic RAM (RDRAM).

The foregoing only illustrates several embodiments of the disclosure, and their descriptions are more specific and detailed. However, the foregoing embodiments should not be construed as limiting the scope of the disclosure. It should be noted that, for those of ordinary skill in the art, without departing from the concept of the present application, a number of modifications and improvements can also be made, which all fall within the protection scope of disclosure. Therefore, the protection scope of the patent shall be subject to the appended claims.

What is claimed is:
1. A method for image processing, comprising:
  obtaining an image to be processed;
  determining edge pixel points in the image to be processed by performing edge detection on the image to be processed;

determining the number of the edge pixel points in the image to be processed as a first pixel number;

determining the number of edge pixel points of a specified color as a second pixel number when the first pixel number is larger than a first number threshold; and determining that a moire pattern exists in the image to be processed when the second pixel number is larger than a second number threshold, wherein the second number threshold is smaller than or equal to the first number threshold.

2. The method of claim 1, wherein determining the number of the edge pixel points in the image to be processed as the first pixel number comprises:

performing binary processing on the image to be processed to obtain a binary image, wherein the binary image comprises pixel points of a first color and pixel points of a second color;

determining the pixel points of the first color as the edge pixel points in the image to be processed; and determining the number of the pixel points of the first color in the binary image as the first pixel number.

3. The method of claim 1, wherein determining the number of the edge pixel points of the specified color as the second pixel number comprises:

performing cluster processing on the edge pixel points of the specified color to obtain a plurality of categories of edge pixel points, wherein each category of edge pixel points forms a continuous edge line;

determining an edge line with a length exceeding a length threshold as a target edge line; and determining the total number of edge pixel points in the target edge line as the second pixel number.

4. The method of claim 1, further comprising:

determining a minimum rectangular region containing all the edge pixel points in the image to be processed;

determining the number of pixel points in the minimum rectangular region as a region pixel number; and obtaining the first number threshold according to the region pixel number.

5. The method of claim 4, wherein determining the minimum rectangular region containing all the edge pixel points in the image to be processed comprises:

establishing a coordinate system according to the image to be processed and obtaining a coordinate of each of the edge pixel points in the coordinate system; and determining vertex coordinates according to the obtained coordinate of each of the edge pixel points and determining the minimum rectangular region according to the vertex coordinates.

6. The method of claim 1, further comprising:

determining that no moire pattern exists in the image to be processed when the first pixel number is smaller than or equal to the first number threshold; and recognizing the image to be processed to obtain an image classification tag for the image to be processed, wherein the image classification tag is indicative of a classification of the image to be processed.

7. The method of claim 1, further comprising:

eliminating the moire pattern in the image to be processed based on a determination that the moire pattern exists in the image to be processed; and recognizing the image to be processed to obtain an image classification tag for the image to be processed after the moire pattern is eliminated, wherein the image classification tag is indicative of a classification of the image to be processed.

8. A non-transitory computer readable storage medium configured to store computer programs, the computer programs which, when executed by a processor, are operable with the processor to:

obtain an image to be processed;

determine edge pixel points in the image to be processed by performing edge detection on the image to be processed;

determine the number of the edge pixel points in the image to be processed as a first pixel number;

determine that a moire pattern exists in the image to be processed when the first pixel number is larger than a first number threshold, establish a coordinate system according to the image to be processed and obtain a coordinate of each of the edge pixel points in the coordinate system;

determine vertex coordinates according to the obtained coordinate of each of the edge pixel points and determine a minimum rectangular region according to the vertex coordinates;

determine the number of pixel points in the minimum rectangular region as a region pixel number; and obtain the first number threshold according to the region pixel number.

9. The non-transitory computer readable storage medium of claim 8, wherein the computer programs operable with the processor to determine the number of the edge pixel points in the image to be processed as the first pixel number are operable with the processor to:

perform binary processing on the image to be processed to obtain a binary image, wherein the binary image comprises pixel points of a first color and pixel points of a second color;

determine the pixel points of the first color as the edge pixel points in the image to be processed; and determine the number of the pixel points of the first color in the binary image as the first pixel number.

10. The non-transitory computer readable storage medium of claim 8, wherein the computer programs operable with the processor to determine that the moire pattern exists in the image to be processed when the first pixel number is larger than the first number threshold are operable with the processor to:

determine the number of edge pixel points of a specified color as a second pixel number when the first pixel number is larger than the first number threshold; and determine that the moire pattern exists in the image to be processed when the second pixel number is larger than a second number threshold, wherein the second number threshold is smaller than or equal to the first number threshold.

11. The non-transitory computer readable storage medium of claim 10, wherein the computer programs operable with the processor to determine the number of the edge pixel points of the specified color as the second pixel number are operable with the processor to:

perform cluster processing on the edge pixel points of the specified color to obtain a plurality of categories of edge pixel points, wherein each category of edge pixel points forms a continuous edge line;

determine an edge line with a length exceeding a length threshold as a target edge line; and determine the total number of edge pixel points in the target edge line as the second pixel number.

12. The non-transitory computer readable storage medium of claim 8, wherein the computer programs are further operable with the processor to:

determine that no moire pattern exists in the image to be processed when the first pixel number is smaller than or equal to the first number threshold; and recognize the image to be processed to obtain an image classification tag for the image to be processed, wherein the image classification tag is indicative of a classification of the image to be processed.

13. An electronic device, comprising:
a processor; and
a memory configured to store computer readable instructions which, when executed by the processor, are operable with the processor to:
  obtain an image to be processed;
  determine edge pixel points in the image to be processed by performing edge detection on the image to be processed;
  determine the number of the edge pixel points in the image to be processed as a first pixel number;
  perform cluster processing on the edge pixel points of a specified color to obtain a plurality of categories of edge pixel points, wherein each category of edge pixel points forms a continuous edge line;
  determine an edge line with a length exceeding a length threshold as a target edge line;
  determine the total number of edge pixel points in the target edge line as a second pixel number; and
  determine that a moire pattern exists in the image to be processed when the second pixel number is larger than a second number threshold, wherein the second number threshold is smaller than or equal to a first number threshold.

14. The electronic device of claim 13, wherein the computer readable instructions operable with the processor to determine the number of the edge pixel points in the image to be processed as the first pixel number are operable with the processor to:
  perform binary processing on the image to be processed to obtain a binary image, wherein the binary image comprises pixel points of a first color and pixel points of a second color;
  determine the pixel points of the first color as the edge pixel points in the image to be processed; and
  determine the number of the pixel points of the first color in the binary image as the first pixel number.

15. The electronic device of claim 13, wherein the computer readable instructions are further operable with the processor to:
  determine a minimum rectangular region containing all the edge pixel points in the image to be processed;
  determine the number of pixel points in the minimum rectangular region as a region pixel number; and
  obtain the first number threshold according to the region pixel number.

* * * * *